(12) United States Patent
Kong et al.

(10) Patent No.: US 6,500,533 B1
(45) Date of Patent: Dec. 31, 2002

(54) OPAQUE POLYMERIC FILMS CAVITATED WITH PBT AND POLYCARBONATE

(75) Inventors: Dan-Cheng Kong, Fairport, NY (US); John A. Larter, Canandaigua, NY (US); Eldridge M. Mount, III, Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/500,608

(22) Filed: Feb. 9, 2000

(51) Int. Cl.[7] ................................................ B32B 5/18
(52) U.S. Cl. .............. 428/317.9; 264/45.3; 264/173.15; 264/173.19; 428/413; 428/483; 428/480; 428/516; 428/523; 428/910
(58) Field of Search .................................. 428/910, 515, 428/516, 480, 483, 412, 304.4, 313.5, 308.4, 317.9, 523

(56) References Cited

U.S. PATENT DOCUMENTS

| | | | |
|---|---|---|---|
| 4,377,616 A | 3/1983 | Ashcraft et al. | 428/213 |
| 4,632,869 A | 12/1986 | Park et al. | 428/315.5 |
| 4,758,462 A | 7/1988 | Park et al | 428/213 |
| 4,879,078 A | 11/1989 | Antoon, Jr. | 264/41 |
| 4,957,943 A | 9/1990 | McAllister et al. | 521/64 |
| 5,194,324 A | 3/1993 | Poirier | 428/315.5 |
| 5,466,520 A | 11/1995 | Krallmann et al. | 428/323 |
| 5,516,563 A | 5/1996 | Schumann et al. | 428/34.2 |
| 5,861,208 A | 1/1999 | Schreck | 428/327 |
| 5,866,246 A | 2/1999 | Schreck et al. | 428/327 |
| 5,945,205 A | * 8/1999 | Keller et al. | 428/213 |

* cited by examiner

Primary Examiner—D. Lawrence Tarazano
(74) Attorney, Agent, or Firm—Rick F. James; Keith A Bell

(57) ABSTRACT

A method for producing an opaque polymeric film comprises:
(a) extruding a base layer comprising a polymeric matrix and at least one cavitating agent;
(b) coextruding at least one additional layer on at least one side of the base layer;
(c) cooling the coextruded multi-layer film; and then
(d) orienting the film in at least the machine direction (MD);
wherein at least said base layer contains polybutylene terephthalate (PBT) and polycarbonate.

6 Claims, No Drawings

OPAQUE POLYMERIC FILMS CAVITATED WITH PBT AND POLYCARBONATE

FIELD OF THE INVENTION

The present invention relates to opaque polymeric films. More particularly, this invention relates to oriented opaque polymeric films prepared with a cavitating agent comprising polybutylene terephthalate (PBT) and polycarbonate.

BACKGROUND OF THE INVENTION

Opaque polymeric films having a polyolefin core layer, e.g., of an oriented isotactic polypropylene (OPP), have been widely used in food and non-food packaging applications, because such films have desirable properties such as resistance to transmission of moisture, air, deleterious flavors, and the like, as well as outstanding mechanical properties.

During the production of these opaque polymeric films, cavitating agents may be used. In cases where polybutylene terephthalate (PBT) is used as the cavitating agent, extrusion plate out can be problem. In particular, PBT may degrade and build up in the film production equipment, forming deposits which further affect the flow patterns of molten polymer in the die. The use of PBT cavitating agents to prepare opaque polymeric films is described in U.S. Pat. No. 4,632,869 to Park et al.

SUMMARY OF THE INVENTION

There is provided an opaque polymeric film comprising:
(a) a base layer comprising a polymeric matrix and at least one cavitating agent; and
(b) at least one additional layer;
wherein said cavitating agent comprises polybutylene terephthalate (PBT) and polycarbonate.

There is also provided a method for producing an opaque polymeric film comprising:
(a) extruding a base layer comprising a polymeric matrix and at least one cavitating agent;
(b) coextruding at least one additional layer on at least one side of the base layer;
(c) cooling the coextruded multi-layer film; and then
(d) orienting the film in at least the machine direction (MD);
wherein said cavitating agent comprises polybutylene terephthalate (PBT) and polycarbonate.

Advantages of the present films indude (1) reduced extrusion plate out during manufacture (2) uniform opacity, and (3) resistance to distortion caused by film crease.

DETAILED DESCRIPTION OF THE INVENTION

The base layer of the opaque polymeric film comprises a polymeric matrix, which may be selected from any of the polymers previously used in the art for such purpose. In many cases, such a polymer is a polyolefin having a melting point, for example, of at least about 150° C. and up to, for example, about 167° C. Preferably, the polyolefin of the base layer has a relatively high degree of crystallinity. A particularly desirable polyolefin as the base layer polymer is an isotactic polypropylene homopolymer having a crystallinity of, for example, about 89 to 99% (as measured by $^{13}C$ NMR spectroscopy using meso pentads), a melting point of about 155 to about 165° C., and a melt index of about 0.5 to about 15 g/10 minutes (as measured by the standard ASTM D1238 methods).

Other suitable polymeric matrix materials for the base layer include, but are not limited to, syndiotactic polypropylene, ethylene-propylene copolymers, ethylene-propylene-butylene terpolymers, butylene-ethylene copolymers, functionally grafted copolymers, blends of polymers, etc.

At least one cavitating agent in the form of a dispersed phase is provided in the base layer polymeric matrix material before extrusion and orientation of the film. Such dispersed phase comprises particles of polybutylene terephthalate (PBT) and polycarbonate. This dispersed phase may also, optionally, comprise at least one additional cavitating agent.

Polybutylene terephthalate is a semicrystal polymer which has low viscosity and, as discussed above, tends to plate out during extrusion. This plate out can be observed by pulling out the screw of the extruder and seeing polybutylene terephthalate build-up on metal surfaces after, for example, a 48 hour run.

Polycarbonate is an amorphous, high viscosity polymer. Polycarbonate is partially miscible with polybutylene terephthalate. It is believed that polycarbonate traps polybutylene terephthalate inside of the matrix polymer, thereby avoiding or reducing plate-out. The present process, therefore, represents an improvement over the aforementioned process of U.S. Pat. No. 4,632,869, where PBT is used in the absence of polycarbonate.

The mixture of polycarbonate and polybutylene terephthalate inside the polymer matrix may be from 4 wt % to 20 wt % of the entire weight of the cavitated layer. The weight ratio of polybutylene terephthalate to polycarbonate may be from 1:1 to 4:1.

The optional additional cavitating agent may be a material having a melting point that is higher than the melting point of the polymeric matrix material of the base layer. The optional additional cavitating agent may also be immiscible with polymeric matrix material of the base layer. The optional additional cavitating agent may be any of those described in U.S. Pat. No. 4,377,616, the entire disclosure of which are incorporated herein by reference. Thus, the optional additional cavitating agent may be selected from a polymer, such as, for example, a polyester other than PBT, nylon (e.g., nylon-6), an acrylic resin, or an ethylene norborene copolymer; or an inorganic material, such as, glass, calcium carbonate, metal, or ceramic, or mixtures thereof.

The particle size of cavitating agents in the dispersed phase may be, for example, about 0.1 micron to about 5 microns, more preferably about 0.2 micron to about 2 microns. The dispersed phase may be present in the base layer in an amount of up to about 20 weight percent, for example, from about 4 to about 20 weight percent, based on the entire weight of the base layer.

To preserve the structural integrity of the dispersed phase-containing base layer, a thin layer of the base layer polymeric matrix material without the dispersed phase may be coextruded on one or both sides of the dispersed phase-containing base layer polymeric matrix material. In this case, the total of the dispersed phase-containing polymer layer and the non-dispersed phase-containing layer(s) may be considered the overall base layer of the film. When such a polymer substrate is subjected to uniaxial or biaxial orientation, a cavity forms around the distributed dispersed phase moieties, providing a film having an opaque appearance.

The base layer of the film is of sufficient thickness to provide bulk properties, such as barrier, stiffness, etc. that are desired for product protection and good performance on packaging equipment. Preferably, the thickness ranges from about 50% to about 100%, based on the thickness of the entire film structure.

Additional layer(s) of the present invention may be any of the coextrudable, biaxially orientable film-forming resins known in the art. Such materials include, but are not limited to, syndiotactic polypropylene, low density polyethylene (LDPE), linear low density polyethylene (LLDPE), medium density polyethylene (MDPE), high density polyethylene (HDPE), ethylene-propylene copolymers, butylene-propylene copolymers, ethylene-butylene copolymers, ethylene-propylene-butylene terpolymers, ethylene-vinyl acetate copolymers, ethylene-vinyl alcohol copolymers, nylons, polymers grafted with functional groups, appropriate blends of these, and others known to those skilled in the art. Each additional layer preferably has a range in thickness from about 0.005 mil to about 0.15 mil, preferably from about 0.02 mil to about 0.10 mil.

There can be more than one additional layer coextruded on each side of the base layer. That is, one or more layers can be added to the surface of the base layer. Films having such a multi-layer structure are represented, in simplified form, as having a structure "ABCDE" where "C" represents a base layer, "B" represents an additional layer adjacent to the base layer and "A" represents a further additional layer or skin layer applied to the outer surface of layer "B." In such a film structure, the additional layer "B" can be referred to as a "tie-layer" or an "intermediate layer." Layers "A" and "B" can be the same or different. Similarly, "D" and "E" represent additional layers on the other side of the base layer, and they may be the same or different. Layers "B" and "D" may be the same or different, and layers "A" and "E" may be the same or different. Additionally, structures containing more than five layers are contemplated, e.g. seven, nine, or more layers.

In order to modify or enhance certain properties of the multi-layer films of the present invention for specific end-uses, it is possible for one or more of the layers to contain appropriate additives in effective amounts. Preferred additives include, but are not limited to anti-blocks, anti-static agents, coefficient of friction (COF) modifiers, processing aids, colorants, clarifiers, and other additives known to those skilled in the art.

Also, one or more of the exposed layers of the multi-layer films of the present invention can be surface-treated to render the films receptive to printing inks, adhesives and/or coatings. The surface treatment can be carried out by any method known in the art such as corona discharge treatment or flame treatment.

Optionally, a coating may be applied to one or both of the exposed surfaces of the outermost layers of the film. Prior to application of the coating material, the film may be surface treated or may be primed with a primer layer. Appropriate coatings contemplated include acrylic coatings such as those described in U.S. Pat. Nos. 3,753,769 and 4,865,908, both of which are incorporated herein by reference, and PVDC coatings such as those described in U.S. Pat. Nos. 4,214,039; 4,447,494; 4,961,992; 5,019,447 and 5,057,177, all of which are incorporated herein by reference. A vinyl alcohol polymer may also be used as a coating composition, such as VINOL 325.

Appropriate primer materials are poly(ethyleneimine), epoxy primers, and the like.

The outer surface of the film is preferably treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, and the like. Although any of these techniques are effectively employed to pretreat the film surface, a particularly desirable method of treatment is the so-called corona treatment method which comprises exposing the film surface to a high voltage corona discharge while passing the film between a pair of spaced electrodes. After corona treatment of the film surface, the coating composition is then applied thereto.

The exposed treated or untreated surfaces of the film may have applied to them coating compositions, as mentioned above, and/or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbonded polyolefin fiber, melt-blown microfibers; a metallizing layer, etc. The application may employ a suitable adhesive, e.g., a hot melt adhesive such as low density polyethylene, ethylene-methacrylate copolymer, water-based adhesives such as polyvinylidene chloride latex, and the like.

The extruded film can be stretched in the machine direction, coated with the coating composition and then stretched perpendicularly in the transverse direction. In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). Generally, the coating comprises 1 to 25 wt %, preferably 7 to 15 wt % of the entire coated film composition. The coating on the film is subsequently dried by hot air, radiant heat or by any other convenient means.

The film of the invention may have a total thickness ranging from about 0.2 mil to about 5 mils, specifically from about 0.4 mil to about 2.5 mils. The thickness relationship of the layers can be important. For example, the base layer may constitute about 40 to about 100 percent of the total film thickness, any intermediate layers may have a thickness ranging from about 0 to about 30 percent of the total film thickness while any outer skin layers may range from about 0 to about 10 percent of the total film thickness.

Multi-layer films may be prepared employing commercially available systems for coextrusion.

It is preferred that all layers of the multi-layer film structures of the present invention be coextruded. Thereafter, the film is biaxially oriented. Specifically, the polymers are brought to the molten state and coextruded from a conventional extruder through a flat sheet die, the melt streams are combined in an adapter prior to being extruded from the die or within the die. After leaving the die, the multi-layer web is chilled and the quenched web is reheated and oriented. Preferably, the film is oriented by biaxially stretching the film. The film can be oriented by stretching from about 3 to about 11 times in the machine direction (MD) at temperatures ranging from about 105° C. to about 150° C. and from about 3 to about 12 times in the transverse direction (TD) at temperatures ranging from about 150° C. to about 165° C.

Films which are cavitated with PBT alone tend to have a distorted appearance when such films are creased or folded.

In particular, a honeycomb appearance may show up on the surface of such creased films. However, the present films, cavitated with both PBT and polycarbonate, are more resistant to distortion caused by folding or creasing of the film.

EXAMPLE

A three-layer oriented film, having a skin layer A, a core layer. B and a skin layer C, was produced. The core layer B was prepared by pellet blending isotactic polypropylene with polybutylene terephthalate and polycarbonate to make the ratio of 86 parts of polypropylene to 7 parts of polybutylene terephthalate and 7 parts of polycarbonate. The isotactic polypropylene in core layer B was PP 3371, sold by Fina Oil and Chemical Company. The components of the core layer B were extruded at a temperature of 280° C.

The skin layers A and C were made from EP 8573, which is a copolymer of ethylene and propylene sold by Fina Oil and Chemical Company.

The three layers were coextruded and stretched 5.2 times in the machine direction (MD) and 8 times in the transverse direction (TD). The MD orientation temperature ranged from 95° C. to 100° C., and the TD orientation temperature ranged from 160° C. to 170° C. Skin layers A and C were each 1 μm in thickness, and core layer B was 23 μm in thickness.

The resulting film had an opacity of 20% light transmission.

What is claimed is:

1. An opaque polymeric film comprising:
    (a) a base layer comprising a polymeric matrix and at least one cavitating agent; and
    (b) at least one additional layer;
wherein said cavitating agent (i) comprises polybutylene terephthalate (PBT) and polycarbonate in a weight ratio of PBT to polycarbonate of from 1:1 to 4:1 and (ii) is present in an amount of from about 4 to about 20 weight percent, based on the total weight of the base layer.

2. A film according to claim 1 further comprising at least one additional cavitating agent selected from the group consisting of nylon, an acrylic resin, an ethylene norborene copolymer, glass, calcium carbonate, metal, and ceramic.

3. A film according to claim 1, wherein said polymeric matrix is a polypropylene matrix.

4. A method for producing an opaque polymeric film comprising:
    (a) extruding a base layer comprising a polymeric matrix and at least one cavitating agent;
    (b) coextruding at least one additional layer on at least one side of the base layer;
    (c) cooling the coextruded multi-layer film; and then
    (d) orienting the film in at least the machine direction (MD);
wherein said cavitating agent (i) comprises polybutylene terephthalate (PBT) and polycarbonate in a weight ratio of PBT to polycarbonate of from 1:1 to 4:1 and (ii) is present in an amount of from about 4 to about 20 weight percent, based on the total weight of the base layer.

5. A method according to claim 4 further comprising at least one additional cavitating agent selected from the group consisting of nylon, an acrylic resin, an ethylene norborene copolymer, glass, calcium carbonate, metal, and ceramic.

6. A method according to claim 4, wherein said polymeric matrix is a polypropylene matrix.

* * * * *